(12) United States Patent
Bao

(10) Patent No.: US 12,277,077 B1
(45) Date of Patent: Apr. 15, 2025

(54) SOFTWARE-DECOUPLING-BASED HARDWARE CONTROL APPARATUS AND METHOD

(71) Applicant: MACROTEST SEMICONDUCTOR TECHNOLOGY CO., LTD, Nanjing (CN)

(72) Inventor: Zhijie Bao, Nanjing (CN)

( * ) Notice: Subject to any disclaimer, the term of this patent is extended or adjusted under 35 U.S.C. 154(b) by 0 days.

(21) Appl. No.: 18/261,542

(22) PCT Filed: Mar. 15, 2023

(86) PCT No.: PCT/CN2023/081504
§ 371 (c)(1),
(2) Date: Jul. 14, 2023

(87) PCT Pub. No.: WO2023/236613
PCT Pub. Date: Dec. 14, 2023

(30) Foreign Application Priority Data

Jun. 6, 2022 (CN) .......................... 202210627284.1

(51) Int. Cl.
*G06F 13/20* (2006.01)
(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

| 8,312,258 | B2 * | 11/2012 | Xing | G06F 9/4403 |
| | | | | 713/1 |
| 2011/0113431 | A1 | 5/2011 | Shidai et al. | |
| 2013/0305259 | A1 * | 11/2013 | Wang | G06F 9/526 |
| | | | | 718/106 |
| 2016/0055050 | A1 | 2/2016 | Hasebe et al. | |
| 2021/0116494 | A1 * | 4/2021 | Champoux | G11C 29/10 |

* cited by examiner

*Primary Examiner* — Michael Sun
(74) *Attorney, Agent, or Firm* — Hemisphere Law, PLLC; Zhigang Ma

(57) ABSTRACT

The present disclosure discloses a software-decoupling-based hardware control apparatus and method. The software-decoupling-based hardware control apparatus includes one or more parameter test controllers; each parameter test controller includes a test command input FIFO, a command and parameter map memory, a parameter test command processor, and a device control generator. By means of separating a software low level driver from a specific chip controlled by hardware, the present disclosure achieves decoupling between a low level driver function and the specific chip controlled by the hardware, and reduces the maintenance cost and development cycle. Furthermore, the test efficiency in a test process is improved.

5 Claims, 3 Drawing Sheets

SOFTWARE-DECOUPLING-BASED HARDWARE CONTROL APPARATUS AND METHOD

TECHNICAL FIELD

The present disclosure relates to a software-decoupling-based hardware control apparatus and method, and belongs to the field of auto test of integrated circuits.

BACKGROUND

In a hardware design of integrated circuit auto test automation equipment (ATE), many integrated chips would be used, such as a DUT Power Supply (DPS) which supplies power to a Device Under Test (DUT), a Pin Electronics (PE) with analog and digital functions, and a data acquisition chip ADC.
1. Such chips at present are developed towards high integration and systematization. Generally, each type of chip needs to be configured with corresponding driver functions, and configuration of each type of chip is different. This means that chips and their software driver functions are closely related and highly coupled. Admittedly, this type of chip with stronger functions and better performance would greatly improve the performance of the ATE, but inevitably, its driver has a longer development cycle, and higher requirements are put forward on developers.
2. Every iteration of a new set of product or the use of a new chip needs to match a new driver function. As a result, a software design needs to be considered to be compatible with different versions of hardware. This highly coupled relationship is also not conducive to maintenance by the developers.
3. It takes much time to complete the complex setting process of various types of chips through software drivers, which can reduce the overall test efficiency.

SUMMARY

Objectives of the present disclosure: In order to overcome the shortcomings in the prior art, the present disclosure provides a software-decoupling-based hardware control apparatus and method. A software low level driver is separated from a specific chip (circuit controlled by hardware), so that a software driver function is universal, and a type of different chips (circuits) with similar functions can be simultaneously controlled. Decoupling between a low level driver function and a chip controlled by specific hardware is achieved, and the maintenance cost and the development cycle are reduced. The same set of software low level driver function can simultaneously drive hardware circuits (chips) in different versions. A field programmable gate array (FPGA) is used to generate chip configuration data, which can shorten time of switching states of a chip to an extremely large extent, thus improving the test efficiency in a test process.

Technical solution: in order to achieve the above purpose, the present disclosure adopts the technical solution below.

The basic idea of the present disclosure is to convert a driver description of a specific chip in a software driver function into a corresponding hardware operation, thereby replacing the corresponding hardware operation with a universal command in software, and decoupling a software level driver from hardware control. At the same time, the low level function is required to have universality and can simultaneously control a type of chips with similar functions. Therefore, the low level function needs to achieve the following:
1. At a software level, a software driver function cannot include a chip register configuration, that is, software and a chip are no longer directly related.
2. There is a mechanism that can implement a set of software driver function (such as FVMI) that can be simultaneously received and recognized by different hardware, which requires a hardware gating mechanism.
3. At a hardware level, there should be a command parsing mechanism that can receive different control commands sent by software and convert them into control data and control protocol timing (such as a Serial Peripheral Interface (SPI)) for specific chips, and the control data and the control protocol timing are sent to a chip to complete configuration.

A software-decoupling-based hardware control apparatus includes one or more parameter test controllers, wherein each parameter test controller includes a test command input FIFO, a command and parameter map memory, a parameter test command processor, and a device control generator, wherein
the test command input FIFO is configured to cache a control command sent by an upper computer;
the command and parameter map memory is configured to store and read hardware configuration data sets corresponding to all sent control commands of software;
the parameter test command processor is configured to implement control flows corresponding to all the control commands; the parameter test command processor receives the control command of the test command input FIFO, performs parsing according to the control command, and sends the parsed control command to the device control generator;
the device control generator is configured to receive an action content of the control command parsed by the parameter test command processor; and the command and parameter map memory reads the parameters corresponding to the actions, converts the parameters into control interface timing required by hardware, and sends the control interface timing to hardware of a final channel to complete control of the hardware.

Preferably, each test channel is provided with one independent parameter test controller; a uniform software driver sends a control command and completes independent control on a plurality of test channels; at the same time, each channel is implemented by different hardware chips; and the plurality of channels simultaneously generate same or different functions.

Preferably, each configuration data set includes a voltage value, a voltage gear position, an output mode, a measurement gear position, and a measurement mode.

Preferably, each configuration data set constitutes one storage unit of the command and parameter map memory.

A software-decoupling-based hardware control method includes the following steps:
step 1, completing parameter settings, and downloading the parameter settings to the command and parameter map memory;
step 2, completing parameter settings, storing the parameter settings, and invoking a command sending function to complete sending of a control command; and
step 3, after a software low level function completes the parameter settings and the downloading and sending of a command, completing, by the parameter test controllers, the subsequent operations; sending the control command to the parameter test command processor of a gated channel; completing, by the parameter test command processor, parsing of the control command to obtain different command actions according to different control commands; after the control commands are parsed, sending, by the parameter test command processor, a parsing result to the device control generator; after receiving the parsed control commands, completing, by the device control generator, different actions according to different command contents, and controlling the command and parameter map memory to read parameters corresponding to the actions; converting the parameters into control interface timing required by hardware; and sending the control interface timing to hardware of a final channel to complete control of the hardware.

Preferably, the control interface timing is sent to the hardware of the final channel to complete control and data configuration of the hardware.

Compared with the prior art, the present disclosure has the following beneficial effects:

1. The present disclosure achieves the decoupling between the software low level driver and the specific circuit (chip) controlled by the hardware. At the same time, this mechanism can be compatible with controlling different versions of hardware circuits (chips) with similar functions, which reduces the programming, maintenance, and update costs.
2. Multiple independent parameter test controllers (PTCs) can be supported, and synchronous or asynchronous testing of multiple test channels can be achieved.
3. Since an FPGA processes a complicated control process of the specific hardware circuit (chip) in parallel, the complexity of a software driver program and the complexity of test programming are greatly reduced, and the test efficiency is improved.

DETAILED DESCRIPTION OF THE EMBODIMENTS

The present disclosure will be further clarified below in combination with the accompanying drawings and specific embodiments. It should be understood that these examples are only used to illustrate the present disclosure and not to limit the scope of the present disclosure. Modifications made by those skilled in the art in various forms of valence all fall within the scope defined by the appended claims of the present application.

Figure 1:
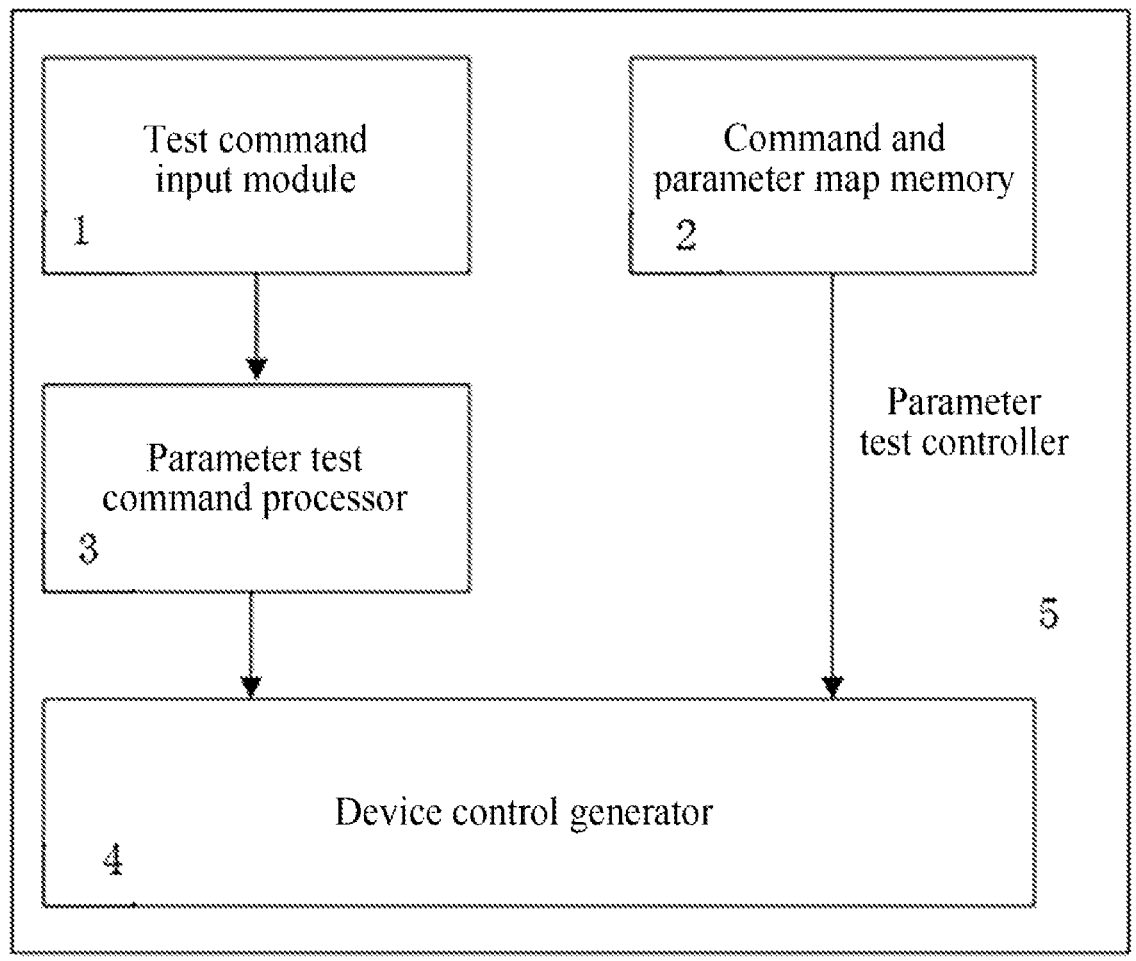
FIG. 1 is a schematic diagram of an internal structure of a parameter test controller.
Figure 2:
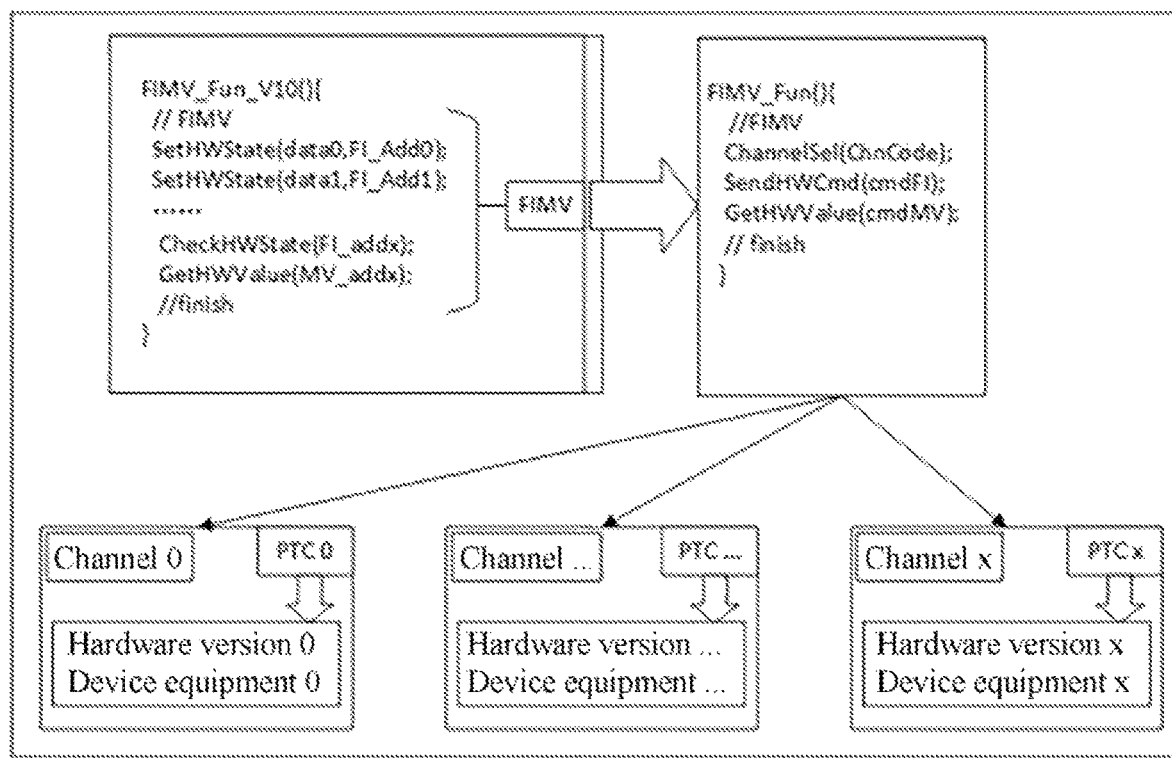
FIG. 2 is a schematic diagram of decoupling between software and hardware.

A software-decoupling-based hardware control apparatus, as shown in FIG. 1 and FIG. 2, includes one or more parameter test controllers 5, wherein each parameter test controller 5 includes a test command input FIFO 1, a command and parameter map memory 2, a parameter test command processor 3 and a device control generator 4, wherein the test command input FIFO (TCIFIFO) 1 is configured to cache a control command sent by an upper computer; and the command and parameter map memory (CPMM) 2 is configured to store and read hardware (chip) configuration data sets corresponding to all sent control commands of software. Map contents are as follows:

Index Command Parameters
0 Cmd0 Para00_Para01_ . . .
1 Cmd1 Para10_Para11 . . .
. . .
. . .
. . .

where Index represents a serial number; Command represents a control command; and Parameters represent a parameter.

Each configuration data set includes a plurality of parameters (ParaXX). For example: each configuration data set includes a voltage value, a voltage gear position, an output mode, a measurement gear position, a measurement mode, and the like, and each configuration data set constitutes one storage unit of the command and parameter map memory 2.

The parameter test command processor (PTCP) 3 is configured to implement control flows corresponding to all the control commands. The parameter test command processor 3 receives the control command of the test command input FIFO 1, performs parsing according to the control command, and sends the parsed control command to the device control generator 4. The parameter test command processor 3 performs corresponding command actions according to different control commands, for example: setting a voltage output at 1.8 V, starting data acquisition, and sending different control codes of specific waveform data. The parameter test command processor 3 submits action contents to the device control generator 4, and the device control generator 4 controls the command and parameter map memory 2 to read configuration data required by the corresponding command actions, convert the data into specific control interface timing (for example: an SPI interface), and send the data to a device to complete configuration.

The device control generator (DCG) 4 is configured to receive an action content of the control command parsed by the parameter test command processor 3; and the command and parameter map memory 2 reads the parameters corresponding to the actions, converts the parameters into control interface timing (for example: an SPI interface) required by hardware (a chip), and sends the control interface timing to hardware (a chip) of a final channel to complete control and data configuration of the hardware (the chip).

The parameter test controller (PTC) 5 is configured to complete storage, parsing, generation of a control signal, and the like on test parameters.

Each test channel is provided with one independent parameter test controller 5; a uniform software driver can send a control command and complete independent control on a plurality of test channels; at the same time, each channel is implemented by different hardware chips; and the plurality of channels simultaneously generate same or different functions.

Figure 3:
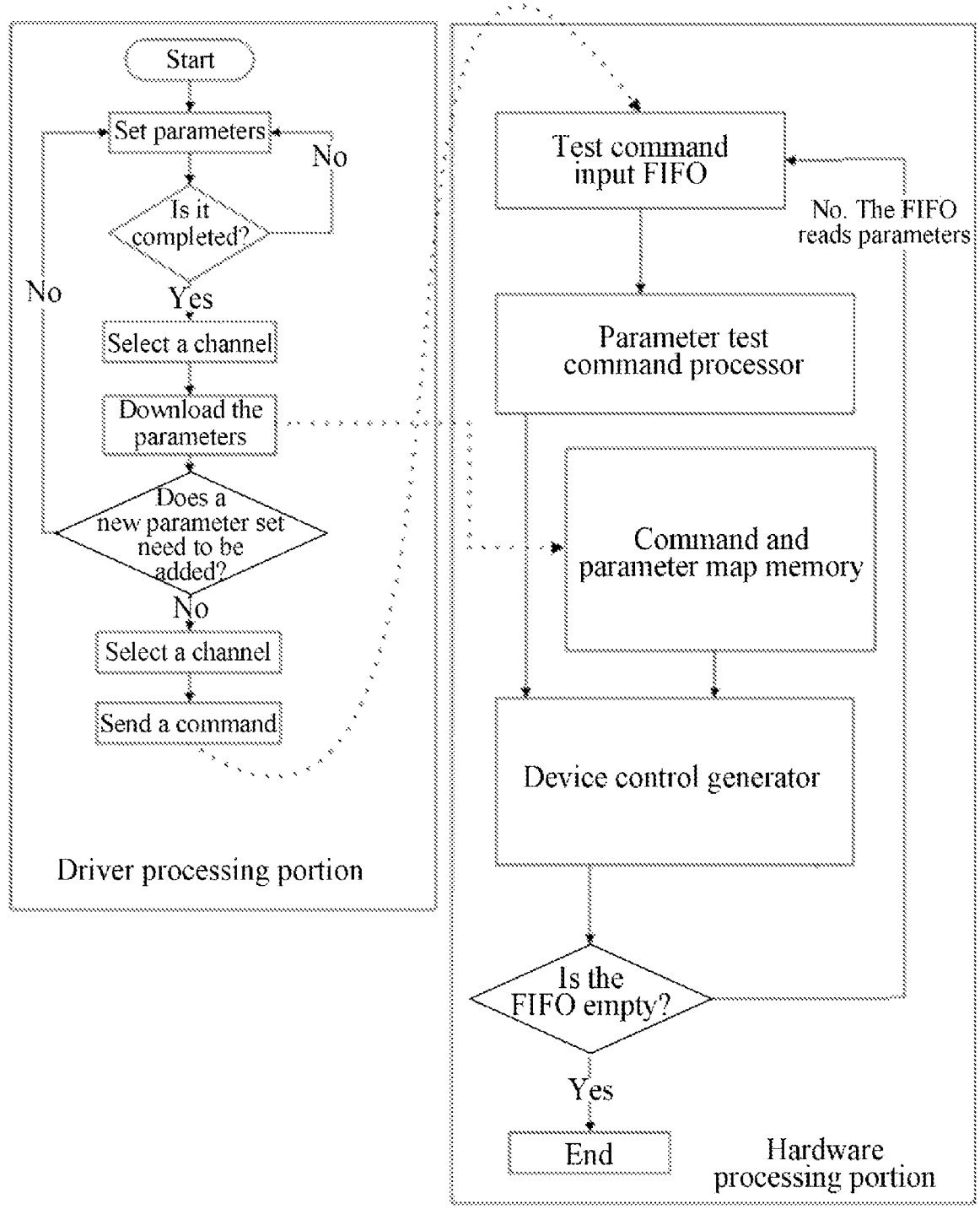
FIG. 3 is a flow chart of an embodiment.

A software-decoupling-based hardware control method, as shown in FIG. 3, includes the following steps:

Step 1, completing parameter settings, and downloading the parameter settings to the command and parameter map memory 2. A dpsPTCSet( ) function can set parameters at one time: such as an output mode, a voltage value, a voltage range, a current value, a current range, a clamp value, and a measurement mode, and store them in the command and parameter map memory 2. It is worth noting that the function has one parameter that can control whether these parameters are downloaded to the multiple independent parameter test controllers 5. The advantage of this setting is that chips with the same output requirement (for example, completing the same FVMI on different channels of the same chip) can complete the setting at one time, without repeated settings.

Step 2, completing parameter settings, storing the parameter settings, and invoking a command sending function to complete sending of a control command. For example, a dpsPTCApply (int PTCode, . . . ) function also has a parameter that is the same as that in the dpsPTCSet( ) function to specify that the command can be received by which parameter test controllers 5.

Step 3, after a software low level function completes the parameter settings and the downloading and sending of a command, completing, by the parameter test controllers 5, the subsequent operations; sending the control command to the parameter test command processor 3 of a gated channel; completing, by the parameter test command processor 3, parsing of the control command to obtain different command actions according to different control commands; for example: setting a voltage output at 1.8 V, starting data acquisition, and sending different control codes of specific waveform data. after the control commands are parsed, sending, by the parameter test command processor 3, a parsing result to the device control generator 4; after receiving the parsed control commands, completing, by the device control generator 4, different actions according to different command contents, and if some operation (such as FVMI) needs to use a device configuration parameter, controlling the command and parameter map memory 2 to read parameters corresponding to the actions; converting the parameters into control interface timing (specific communication protocol data (such as SPI)) required by hardware; and sending the control interface timing to hardware of a final channel to complete control of the hardware. In addition, a control signal of a device can be generated directly without configuration data (such as a high-impedance state).

The software low level driver in this embodiment does not need to directly participate in the specific control work of the hardware circuit (chip). All the parameter attributes only need to be pre-stored in the CPMM, and then only the control commands are sent to complete the control of the hardware circuit (chip), regardless of a specific hardware address and data. Therefore, the software and hardware decoupling design method of the present disclosure achieves the decoupling between the software low level driver and the circuit (chip) controlled by the hardware, so that one set of software driver can simultaneously drive different versions of hardware circuits (chips).

The present disclosure decouples the low level driver from the hardware, so that the software driver function is universal and can simultaneously control one type of hardware circuits (chips) with similar functions. Only the test parameters corresponding to the various commands are downloaded to the CPMM, and then the command codes are sent in the software driver function to change a working state of the hardware circuit (chip), without the need of performing different controls on each hardware circuit (chip) in the software driver function. In addition, when circuits (chips) are upgraded, there is no need to develop corresponding software driver functions as long as the overall function remains unchanged. In addition, the same command code can be transmitted to different PTC modules, but the parsed command actions can be different. This means that the same set of software low level function can be used to control different circuits (chips), without the need of developing different low level functions for different chips. At the same time, it should be pointed out that the control of the hardware circuits (chips) is executed in the FPGA. The parallel execution characteristic of the FPGA will shorten the waiting time during chip configuration, which is also beneficial for improving the test efficiency.

The above describes only the preferred embodiments of the present disclosure. It should be noted that those of ordinary skill in the art can further make several improvements and retouches without departing from the principles of the present disclosure. These improvements and retouches shall all fall within the protection scope of the present disclosure.

What is claimed is:

1. A software-decoupling-based hardware control apparatus, comprising one or more parameter test controllers, wherein each parameter test controller comprises a test command input FIFO, a command and parameter map memory, a parameter test command processor, and a device control generator, wherein:
   the test command input FIFO is configured to cache a control command sent by an upper computer;
   the command and parameter map memory is configured to store and read hardware configuration data sets corresponding to all sent control commands of software;
   the parameter test command processor is configured to receive the control command of the test command input FIFO, perform parsing according to the control command, and send the parsed control command to the device control generator;
   the device control generator is configured to receive an action content of the control command parsed by the parameter test command processor, and the command and parameter map memory reads parameters corresponding to the actions, converts the parameters into control interface timing required by hardware, and sends the control interface timing to hardware of a final channel to complete control of the hardware;
   each test channel is provided with one independent parameter test controller; a uniform software driver sends a control command and completes independent control on a plurality of test channels; at the same time, each channel is implemented by different hardware chips; and the plurality of channels simultaneously generate same or different functions.

2. The software-decoupling-based hardware control apparatus according to claim 1, wherein each configuration data set comprises a voltage value, a voltage gear position, an output mode, a measurement gear position, and a measurement mode.

3. The software-decoupling-based hardware control apparatus according to claim 1, wherein each configuration data set constitutes one storage unit of the command and parameter map memory.

4. A control method based on the software-decoupling-based hardware control apparatus according to claim 1, comprising the following steps:
   step 1, completing parameter settings, and downloading the parameter settings to the command and parameter map memory;
   step 2, completing parameter settings, storing the parameter settings, and invoking a command sending function to complete sending of a control command; and
   step 3, after a software low level function completes the parameter settings and the downloading and sending of a command, completing, by the parameter test controllers, the subsequent operations; sending the control command to the parameter test command processor of a gated channel; completing, by the parameter test command processor, parsing of the control command to obtain different command actions according to different control commands; after the control commands are parsed, sending, by the parameter test command processor, a parsing result to the device control generator; after receiving the parsed control commands, completing, by the device control generator, different actions according to different command contents, and controlling the command and parameter map memory to read parameters corresponding to the actions; converting the parameters into control interface timing required by hardware; and sending the control interface timing to hardware of a final channel to complete control of the hardware.

5. The control method according to claim 4, wherein the control interface timing is sent to the hardware of the final channel to complete control and data configuration of the hardware.

* * * * *